Feb. 21, 1939. G. E. DEY 2,148,191
DOOR HANDLE CONSTRUCTION
Filed April 19, 1937
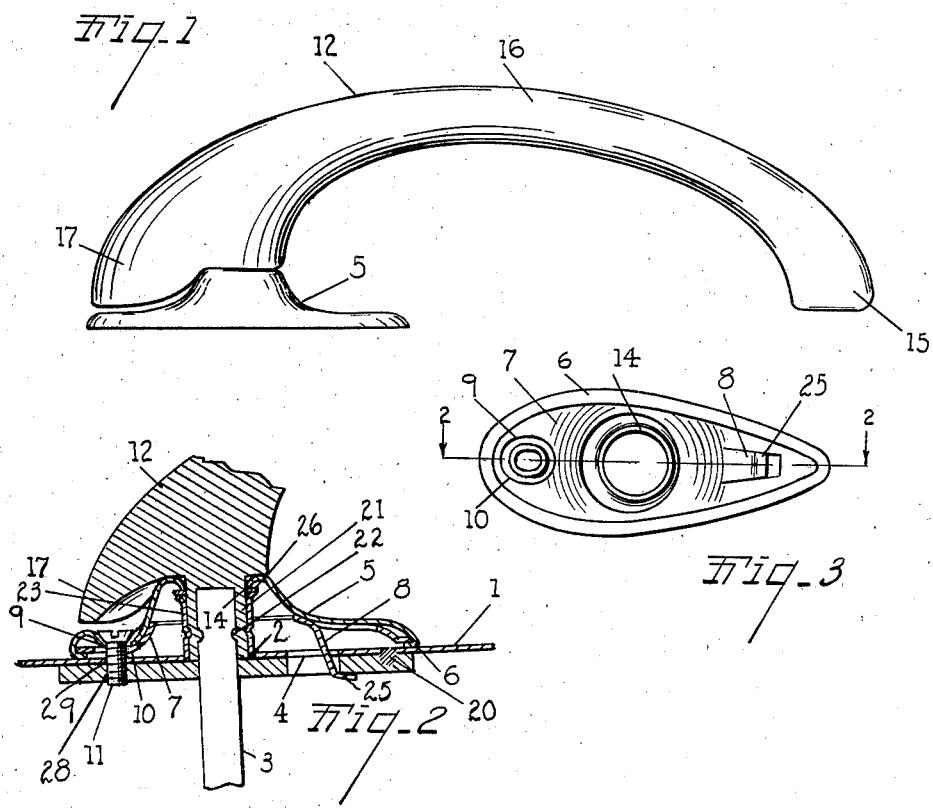
INVENTOR.
George E. Dey
BY Earl F Chappell
ATTORNEYS Patented Feb. 21, 1939

2,148,191

UNITED STATES PATENT OFFICE 2,148,191

DOOR HANDLE CONSTRUCTION

George E. Dey, Grand Rapids, Mich., assignor to W. B. Jarvis Company, Grand Rapids, Mich.

Application April 19, 1937, Serial No. 137,672

3 Claims. (Cl. 292—348)

This invention relates to improvements in door handle constructions.

The main objects of this invention are:

First, to provide an automobile door handle construction including a novel and improved escutcheon member and means for securing the same to a door panel.

Second, to provide an automobile door handle having an escutcheon and means for securing the same to a panel in combination with a handle member of improved design adapted to conceal the escutcheon securing means and protect the same from tampering or removal when the handle is locked.

Third, to provide a construction of the type described embodying a door handle of improved design whereby possibility of the same snagging objects is minimized and accordingly the construction rendered less dangerous to pedestrians and the operators of vehicles.

Fourth, to provide a construction of the type described having provisions to greatly simplify the labor of mounting the same on a door panel.

Fifth, to provide a handle construction of the type described which is characterized by the simplicity of the elements thereof but also possesses great ruggedness and strength and also is attractive in appearance.

Objects relating to details and economies of the invention will appear from the description to follow. The invention is defined in the claims.

A preferred embodiment of the invention is illustrated in the accompanying drawing, wherein:

Fig. 1 is a view in elevation of the door handle and escutcheon plate of my improved construction.

Fig. 2 is a fragmentary view of a door panel and my escutcheon, handle and escutcheon mounting means in longitudinal section on a line corresponding to line 2—2 of Fig. 3.

Fig. 3 is a detail view in bottom plan illustrating the escutcheon and mounting or base plate of the construction of the invention.

This invention relates to a construction wherein to provide an automobile door handle which is attractive in appearance and at the same time is devoid of sharply projecting portions whereby the clothing of pedestrians or other objects might be snagged and thus constitute a menace to safety. Further provisions of the invention deal with novel means for securing the handle and handle escutcheon on a door panel entailing a minimum of labor in the matter of assembly, and still further the invention embodies a novel provision whereby such securing means on the outer side of the door panel is normally completely concealed and protected from tampering by the handle itself, which has novel provision in the form of an overhanging portion to accomplish this end.

Referring to the drawing, the reference numeral 1 indicates the panel of an automobile door, it being reinforced by a plate 20 spot welded thereto and provided with an aperture 2 to receive the conventional lock spindle 3 and a pivot sleeve 21 integral with the door handle. The spindle is grooved at 22 and in assembling the spindle and handle the metal of the sleeve is forced into the groove to lock the handle and spindle securely together. The end of sleeve 21 abuts reinforcing plate 20 and has a ferrule 23 surrounding the same and secured thereto by a groove 24. The panel 1 and reinforcing plate 20 are provided with an aperture 4 for a purpose to be hereinafter described.

The escutcheon is indicated by the reference numeral 5 and comprises an elongated conformed front plate having a peripheral flange 6 spun around the edges of a correspondingly shaped back or base plate 7, the said flange lying between the base plate 7 and panel 1 in assembled position. From an examination of Fig. 2, it is apparent that the base plate 7 is conformed to correspond to the shape of escutcheon 5 in order to internally reinforce the same and is locked rigidly with relation to the escutcheon 5 by the flange 6.

I punch an elongated tongue 8 inwardly from the base plate 7, the said tongue being provided with a forward lip 25 and being adapted to be inserted in the aperture 4 to position the escutcheon and serve as a securing element therefor in operative position. At the end opposite tongue 8, I provide the plates 5, 7, and 20 and panel 1 with alined apertures 9, 10, 28, 29, respectively, which are adapted to receive a bolt 11 for the purpose of locking the escutcheon in position. A washer 26 surrounds sleeve 21 between ferrule 23 and the opening 27 in the escutcheon.

In order to eliminate projections on the handle construction and correspondingly minimize the hazard constituted by sharply protruding handles, ornaments, etc., I form the handle 12 in a continuous curve extending from the end 15 of what may be designated the gripping portion 16 thereof, which end lies closely adjacent the panel 1, to what may be designated a shield or skirt portion 17 lying over and closely adjacent the escutcheon 5 and overhanging the hole 9 and bolt 11 therein. Thus, it will be perceived that the shield portion 17 not only contributes materially to the attractive appearance of the handle and to its increased safety, but also serves to conceal the securing bolt 11 from view in the normal horizontal position of the handle. The foregoing features of improvement are achieved without in any way detracting from the efficiency of operation of the handle. Furthermore, the details herein embodied for mounting the escutcheon and handle on the panel are simple, readily manipulated and very strong.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. In a handle for automobile doors, the combination of an escutcheon, means extending through the escutcheon for securing the same to a door panel, and a handle rotatably mounted on said escutcheon, said handle comprising a gripping portion and an oppositely extending shield portion, said portions lying in a continuous curve terminating in a plane closely adjacent the plane of the escutcheon with said shield portion overhanging and concealing said securing means.

2. In a handle for automobile doors and the like, an escutcheon plate provided with a bolt receiving opening at the rear end thereof, and a handle adapted to be rotatably mounted on said escutcheon and having a gripping portion and an oppositely extending shield portion extending in a continuous curve from the tip of the gripping portion to the end of the shield portion, the shield portion terminating closely adjacent the escutcheon and overhanging the bolt opening therein whereby a fastening bolt engaged with the opening is shielded and the possibility of the handle engaging objects is minimized.

3. In an automobile door handle construction, the combination of an escutcheon, means for securing said escutcheon to a door panel, and a handle rotatably mounted on said escutcheon and having a gripping portion, and an oppositely extending shield portion extending in a continuous outer curve from the tip of the gripping portion to the heel of the shield portion, said shield portion overhanging and lying close to the escutcheon to conceal said securing means.

GEORGE E. DEY.